United States Patent
Zhang et al.

(10) Patent No.: US 7,606,201 B2
(45) Date of Patent: Oct. 20, 2009

(54) HANDOVER ENABLER

(75) Inventors: Li Jun Zhang, Montreal (CA); Laurent Marchand, Montreal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 413 days.

(21) Appl. No.: 11/410,206

(22) Filed: Apr. 25, 2006

(65) Prior Publication Data

US 2006/0251022 A1    Nov. 9, 2006

Related U.S. Application Data

(60) Provisional application No. 60/674,356, filed on Apr. 25, 2005.

(51) Int. Cl.
*H04W 4/00* (2009.01)
(52) U.S. Cl. ............... 370/331; 370/328; 370/338; 455/436; 455/442
(58) Field of Classification Search ............ 370/331, 370/328, 338; 455/426, 442, 436
See application file for complete search history.

(56) References Cited

U.S. PATENT DOCUMENTS

| | | | |
|---|---|---|---|
| 6,775,533 B2* | 8/2004 | Kakani et al. | 455/403 |
| 2004/0082330 A1* | 4/2004 | Marin | 455/438 |

FOREIGN PATENT DOCUMENTS

EP    1 043 869 A2    10/2000

OTHER PUBLICATIONS

Perkins, Charles E.: "Mobile IPv6 and Seamless Mobility", Nokia Research Center, Mountain View, CA, USA; IEEE 802.16e-03/11; Jan. 2003/Mobile IPv6, 29 pages.
Fajardo, V. et al. : << Media-Independant Pre-Authentication (MPA) Implementation Results >> (draft-ohba-mobopts-mpa-implementation-02) ; MOBOPTS Research Group, Internet Draft, expires Sep. 5, 2006; 27 pages.
Dutta, A. et al. : << A Framework of Media-Independent Pre-Authentication (MPA) (draft-ohba-mobopts-mpa-framework-02) ; MOBOTS Research Group, Internet Draft, expires Sep. 6, 2006; 42 pages.
Draves, R.: "Default Address Selection for Internet Protocol", version 6 (IPv6), Microsoft Research, Feb. 2003.

* cited by examiner

*Primary Examiner*—Nghi H Ly
(74) *Attorney, Agent, or Firm*—Ericsson Canada Inc.

(57) ABSTRACT

A system, a method and a Mobile Node (MN) for enabling a handover of the MN from a current serving access router (PAR) to a next serving access router (NAR) in a data communications network. At least one tunnel is present between the PAR and the NAR to enable data exchange therebetween. The MN has a first address valid under the PAR and is capable of forming a second address valid under the NAR prior to completion of the handover. The MN sends a handover request to the PAR and proceeds with a connection to the NAR without discarding its first address. The MN then completes the handover towards the NAR and receives traffic sent on the first address from the NAR.

19 Claims, 8 Drawing Sheets

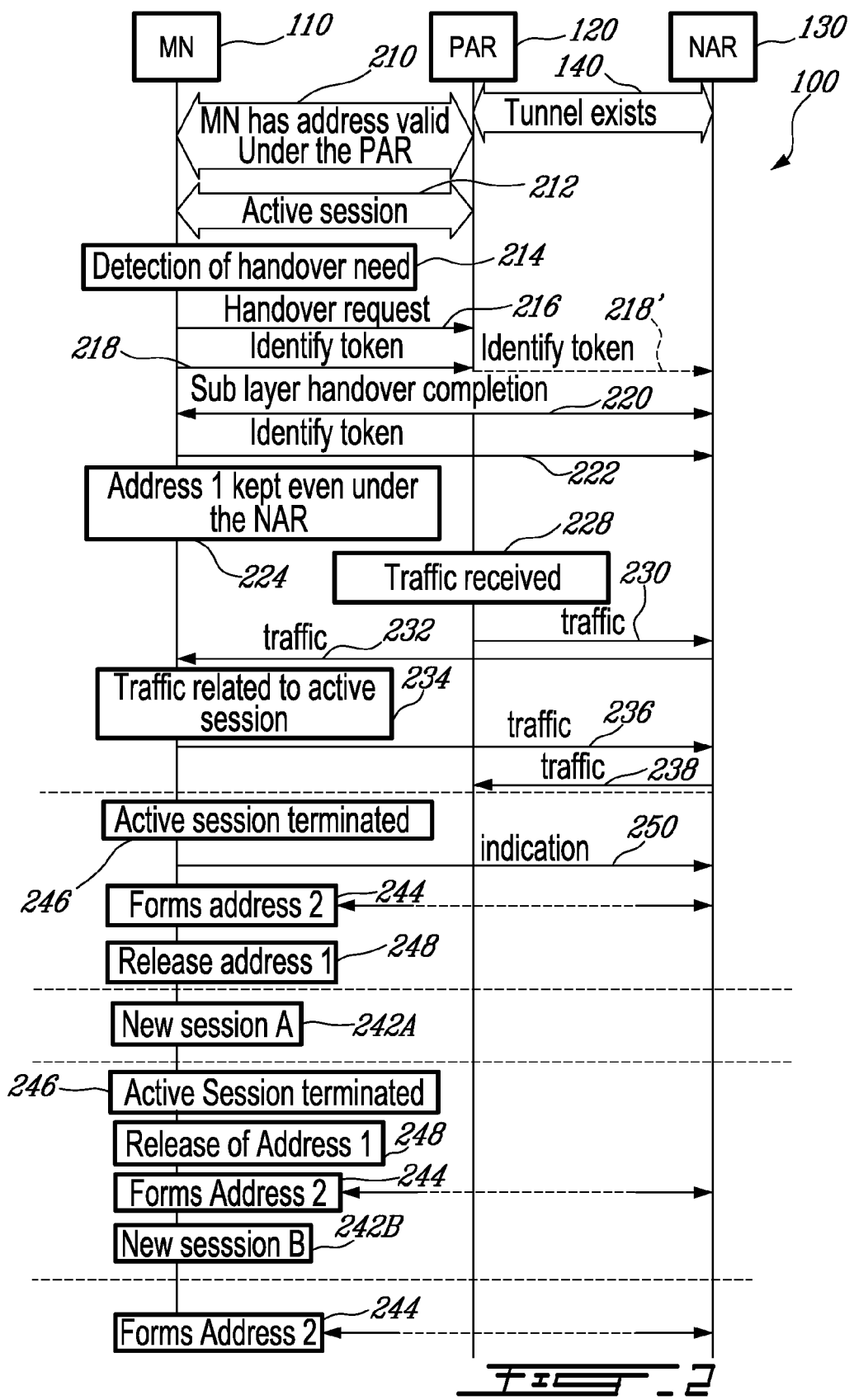

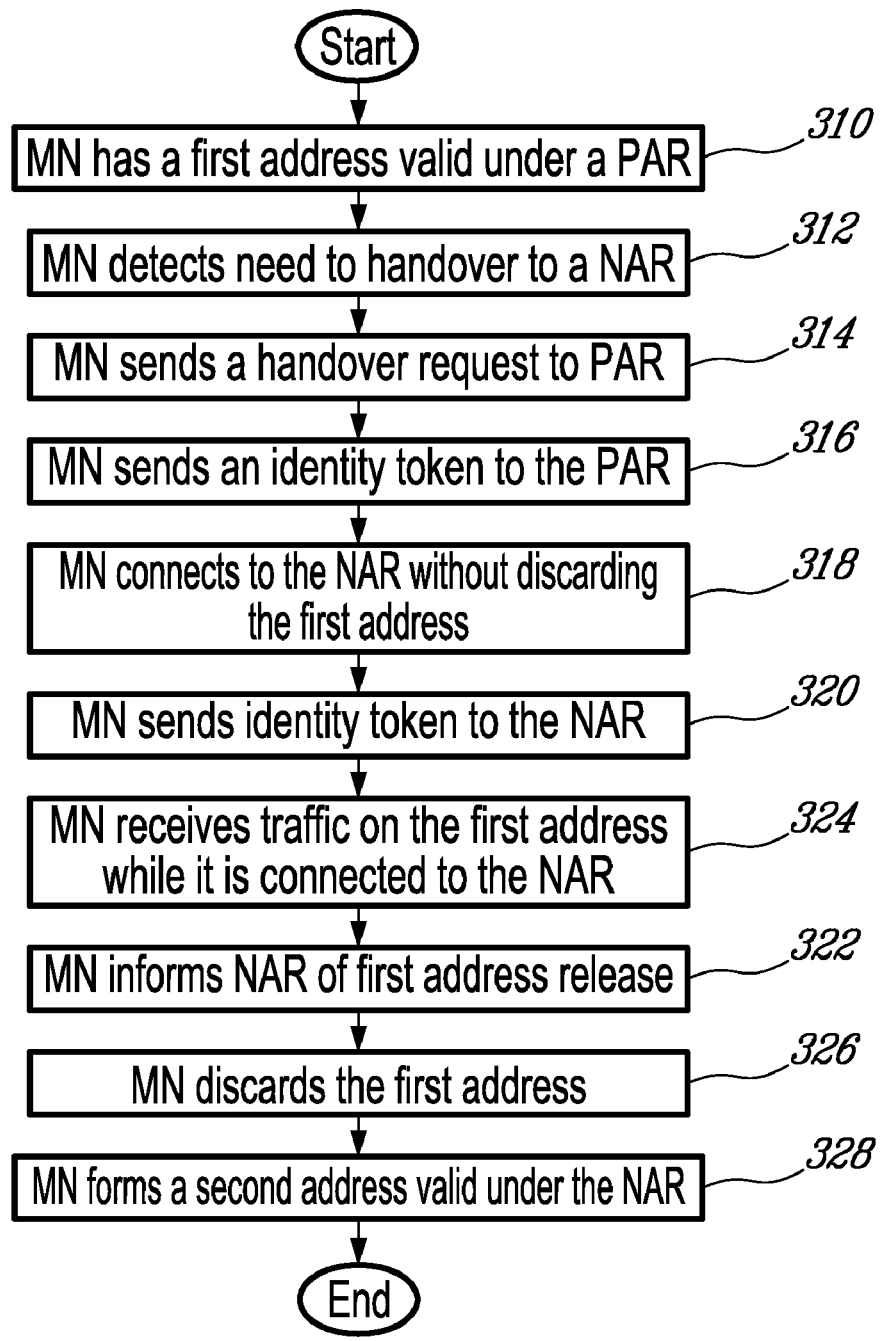

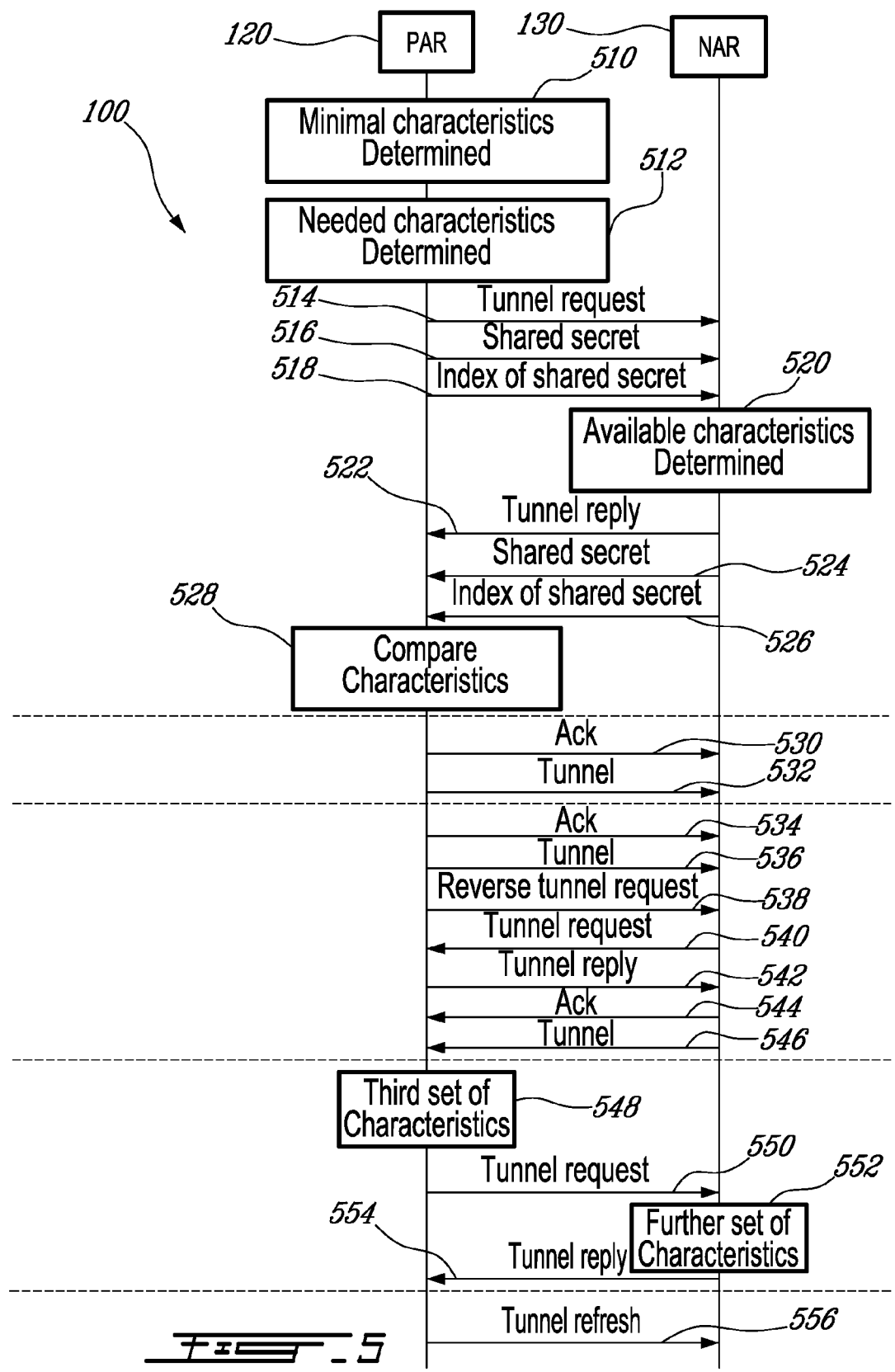

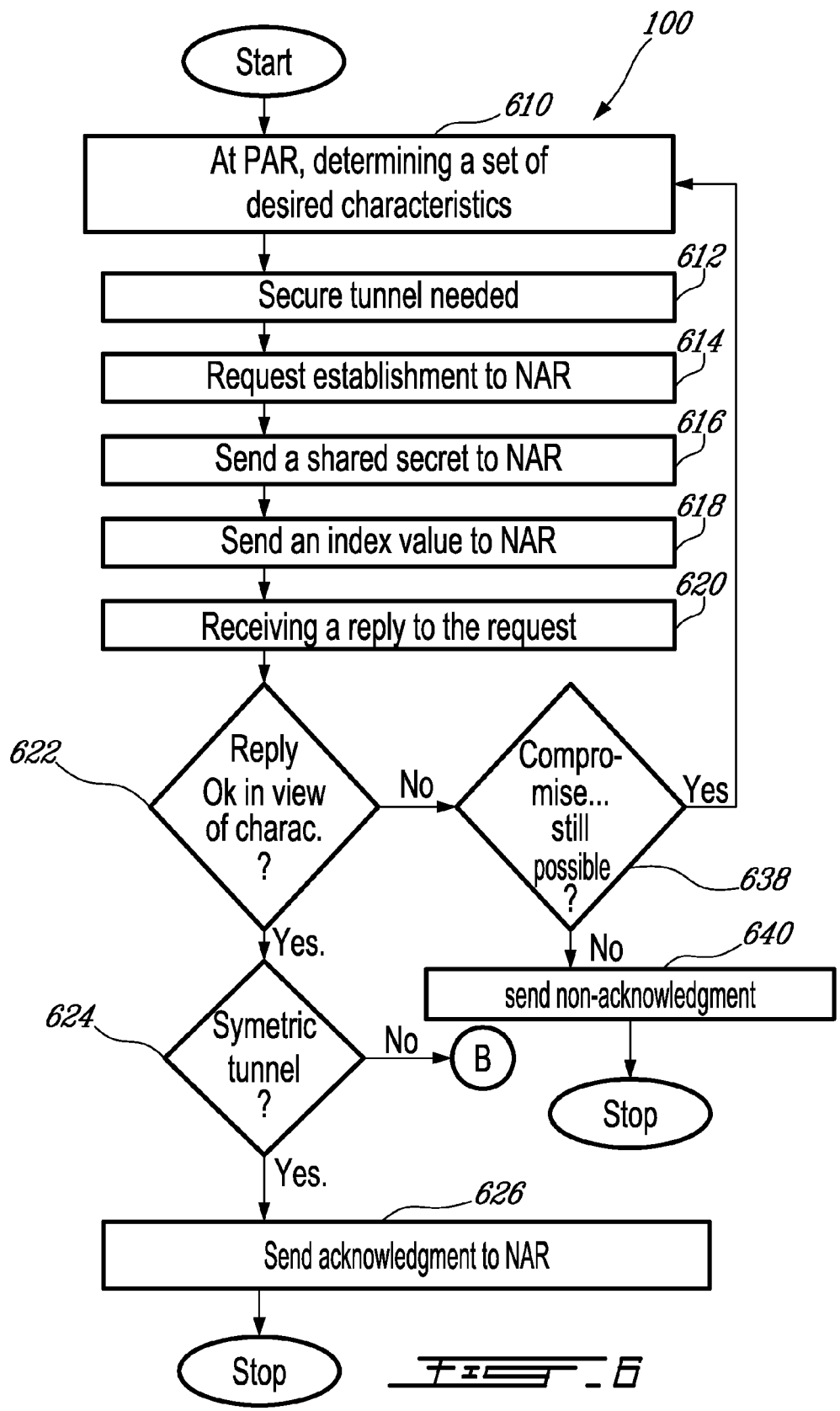

HANDOVER ENABLER

PRIORITY STATEMENT UNDER 35 U.S.C S.119(e) & 37 C.F.R. S.1.78

This non-provisional patent application claims priority based upon the prior U.S. provisional patent applications entitled "OPTIMIZED SEAMLESS HANDOVER IN MOBILE IPv6 NETWORKS", application No. U.S. 60/674, 536, filed Apr. 25, 2005, in the name of Li Jun Zhang, Samuel Pierre and Laurent Marchand.

TECHNICAL FIELD

The present invention relates to handover mechanisms and, more precisely, to handover of mobile nodes between two data network access routers.

BACKGROUND

User mobility and delay sensitive data traffic (e.g., Voice Over Internet Protocol (VoIP)) are two expanding areas within communication systems. To guarantee user mobility in and between mobile communications networks, handover between access routers of the network is an important issue. Wireless networking (which is by definition mobile) and data networking are also converging. Therefore, it is necessary to find the solution for safely transporting delay sensitive data traffic to mobile nodes as they move within or between the communications systems. As the number of mobile users grows, the demand for delay sensitive applications, such as audio streaming, video conference, etc., increases as well.

Furthermore, the communications systems represent a multi-vendor environment. In that context, user mobility is only guaranteed by interoperability of the various equipments. Thus, handover mechanisms, while they can be improved or tweaked within a given vendors' product line, need a common basis on which to rely. Mobile IPv6 (MIPv6; see Internet Engineering Task Force (IETF) RFC 3775 herein included by reference) is one of the standardized protocols that can provide such a common basis.

In the context of Mobile IPv6, when a Mobile Node (MN) enters a new network, it can wait for a Router Advertisement (RtAdv) message, which are sent periodically by access routers, or actively request the RtAdv by sending a Router Solicitation (RtSol) message. The RtAdv message comprises the identity of the emitting access router and further information necessary for the MN to form a Care-of Address (CoA) that it will use in the newly entered network while being connected to the emitting access router. Once the CoA is determined, the MN performs multiple tasks before being able to use the CoA:

a Duplicated Address Detection (DAD) test is performed (e.g., by sending Neighbor Solicitation (NS) to verify the uniqueness of the CoA;
 a Return Routability (RR) test is performed to verify the reachability of its new CoA;
 a Binding Management Key (Kbm) is created by the MN to be used during a session with eventual Correspondent Nodes (CN); and
 a Binding Update (BU) message is sent to the MN's Home Agent (HA) and/or CN, which in turn sends a Binding Acknowledgement (BA) message.

When the MN moves from its current access router towards a second access router, many, if not all, of the preceding steps occur in relation to a RtAdv message issued from the second access router, thereby completing a handover from the current access router to the second access router. The handover happens between different subnets associated to their respective access router. Because of the various tasks performed by the MN, the handover procedure results in a user-perceptible deterioration, especially in delay sensitive applications. For instance, if a MN is involved in a communication with a CN and moves between subnets, it has to send BUs towards its HA and CN. Since the HA and or CN can be located far away from the MN, the round-trip transmission delay will affect the quality of the communication (e.g., because of packet drops and delays of RR or DAD).

Hierarchical MIPv6 (HMIPv6; see IETF RFC 4140 herein included by reference) is improving on the conventional MIPv6 protocol by minimizing the number of BU/BA exchanges needed between the MN and its home network. It provides what can be referred to as a local Home Agent named Mobility Anchor Point (MAP) defining a MAP domain within which the MN is free to move without informing its HA. A regional CoA (rCoA) is added to the MN within the MAP domain. The MIPv6 CoA is replaced with a local CoA (lCoA), which is defined under the access router just as the conventional CoA. When the MN enters the MAP domain, a RtAdv is received (following RtSol or not) comprising information necessary to form the rCoA and the lCoA. A Kbm is computed and DAD and RR tests are performed on both the rCoA and lCoA addresses. More precisely, a first RR test is performed on the rCoA between MN and CN and, during this RR test, the Kbm is computed. The MAP also performs DAD for the MN's rCoA and the MN performs DAD its lCoA. A Secutiry Association (SA) is further established between the MN and the MAP using any key establishment protocols such as Internet Key Exchange (IKE). The rCoA is registered with the HA with a conventional BU/BA exchange and the lCoA is registered with the MAP via a local BU (LBU)/BA (BA) exchange. When the MN moves within the MAP domain between access routers, it registers changes to its lCoA with the MAP via LBU/BA without having to contact the HA. Depending on implementations, the MN may or not use its lCoA during a communication with a CN. If it uses its lCoA with the CN, a conventional BU/BA exchange is needed following modification of its lCoA. If the rCoA is used towards the CN, then no BU/BA exchange is needed in case of intra-MAP domain handover. HMIPv6 further necessitates new DAD for each change of lCoA.

The handover procedure in HMIPv6 is improved compared to MIPv6. However, among other things, there are still delays and packet loss induced upon changing the lCoA that are not acceptable for delay sensitive applications. Furthermore, the HMIPv6 does not provide a solution better than MIPv6 for inter-MAP domain handover.

Fast Handover for MIPv6 (FMIPv6; see IETF RFC 4260 herein included by reference) aims at improving handover latency of the MIPv6 protocol. FMIPv6 necessitates a proper first registration of the MN with a first access router (PAR) as described above. Upon detection of movement of the MN towards a second access router (NAR), a temporary CoA address (nCoA) to be validated by the NAR is assigned to the MN before breakage of its connection with PAR. The DAD and, potentially, RR tests are performed while the MN is moving between the PAR and the NAR, i.e. while the MN is connected to the PAR. Still upon detection of movement of the MN towards the NAR, the MN sends a Fast Binding Update (FBU) to the PAR. The PAR, in turn, starts the setup of a bidirectional tunnel by sending a Handover Initiate (HI) from the PAR to the NAR and waiting for a Handover Acknowledgment (HACK) from the NAR. Once the HACK is received at the PAR, it sends a Fast Binding Acknowledgment (FBACK) to the MN. The PAR thereafter forwards traffic received for the MN on the tunnel thereby reducing the number of lost packets. Once the MN reaches the NAR, it resumes its communication with a CN. Then, the MN completes a BU with the CN and/or its Home Agent (HA). The tunnel is thereafter torn down and the MN starts using its nCoA.

FMIPv6 presents multiple flaws such as, for instance, a weak mechanism of movement detection. Since movement cannot be properly predicted, the mechanism cannot be properly triggered and is thus rarely used to its optimal potential. Furthermore, even if it is assumed to be properly triggered, FMIPv6 also causes problems of Quality of Service (QoS) management and scalability. In tested implementations, FMIPv6 further loses packets in the period where the MN is disconnected from the PAR and not yet connected to the NAR even if the tunnel exists. On other hand, in case of fast movement of the MN, the MN could arrive under the NAR much before the completion of tunnel setup. As a result, traffic may never reach the MN thereby causing packet loss. While FMIPv6 improves the performance of MIPv6 based on movement anticipation, it does not sufficiently meet the requirement of delay sensitive applications. Furthermore, the tunnel management in FMIPv6 is problematic given, for instance, the lack of precision of the trigger mechanism.

A mix of HMIPv6 and FMIPv6 also exists, but does not either provide for a solution sufficient for delay sensitive applications (e.g., problem with inter-domain handover, QoS management, scalability, etc.).

The foregoing is a discussion of solutions in view of the MIPv6 standard, which is usually referred to at the level 3 of the Open System Interconnection (OSI) model. However, the same concern in relation to handover for delay sensitive applications in data networks can be seen from other perspectives (e.g., from the OSI layer 2 or from other level 3 standards such as IPv4). Unfortunately, solutions are yet to be seen concerning handover procedure for delay sensitive applications in those perspectives as well.

As can be appreciated, there is a need for a handover mechanism that can increase fulfillment of the requirements of delay sensitive applications in data network environments.

SUMMARY

Among other things, using the handover mechanism in accordance with the present invention enables communications to be closer to unperturbed. In fact, the present handover mechanism reduces the time during which the MN is not reachable and tends to avoid extensive procedures of address binding. It further reduces the likelihood of costly context re-initialization following handover A first aspect of the present invention is directed to a system for enabling a handover in a data communications network of a mobile node (MN). The system comprises a current serving access router (PAR) with which the MN has a first address and a next serving access router (NAR) with which the MN is capable of forming a second address, wherein at least one tunnel is present between the PAR and the NAR to enable data exchange therebetween. The MN sends a handover request towards the PAR and completes the handover with the NAR without discarding its first address. The PAR forwards traffic received for the MN on its first address on the tunnel. The NAR, following completion of the handover of the MN with the NAR, forwards traffic received for the MN on the tunnel to the first address of the MN.

A second aspect of the present invention is directed to a method for enabling a handover of a mobile node (MN) from a current serving access router (PAR) to a next serving access router (NAR) in a data communications network. At least one tunnel is present between the PAR and the NAR to enable data exchange therebetween. The MN has a first address valid under the PAR and is capable of forming a second address valid under the NAR prior to completion of the handover. The method comprises steps of, at the MN, sending a handover request to the PAR, at the MN, proceeding with a connection to the NAR without discarding the first address, completing the handover between the MN and the NAR and, at the MN, receiving traffic sent on the first address from the NAR.

A third aspect of the present invention is directed to a mobile node (MN) for enabling handover from a current serving access router (PAR) to a next serving access router (NAR) in a data communications network. At least one tunnel being present between the PAR and the NAR to enable data exchange therebetween. The MN comprises an address management module and a handover management module. The address management module has a first address valid under the PAR and is capable of forming a second address valid under the NAR prior to completion of the handover. The handover management module sends a handover request to the PAR, proceeds with a connection to the NAR without discarding the first address, completes the handover between the MN and the NAR and receives traffic sent on the first address from the NAR.

BRIEF DESCRIPTION OF THE DRAWINGS

A more complete understanding of the present invention may be obtained by reference to the following Detailed Description when taken in conjunction with the accompanying drawings wherein:

FIG. 2 is an exemplary signal and nodal operation chart of a handover mechanism in accordance with the teachings of the present invention;

FIG. 3 is a flow chart of a method for enabling a handover of a mobile node from a current serving access router to a next serving access router in a data communications network in accordance with the teachings of the present invention;

FIG. 5 is a nodal operation and signal flow chart of an exemplary dynamic setup of at least one tunnel between two nodes in the data communications network 100 in accordance with the teachings of the present invention;

DETAILED DESCRIPTION

The present invention is directed to a handover mechanism for a Mobile Node (MN) currently under responsibility of a current serving access router (PAR). The MN has a first address valid under the PAR. As the MN moves towards a next serving access router (NAR), it triggers a handover in accordance with the present invention by informing the PAR of its need to handover to the NAR. While the MN effectively moves under responsibility of the NAR, it still keeps its first address for as long as it is needed to reduce the adverse effects of the handover. That is done even if the NAR may not support the first address as it is invalid thereunder. Traffic related to the MN, while it is exchanged between the MN and the NAR, is exchanged on at least one preexisting tunnel between the PAR to the NAR while the MN uses its first address. The MN can further setup a second address valid under the NAR and use it therewith.

Figure 1A:
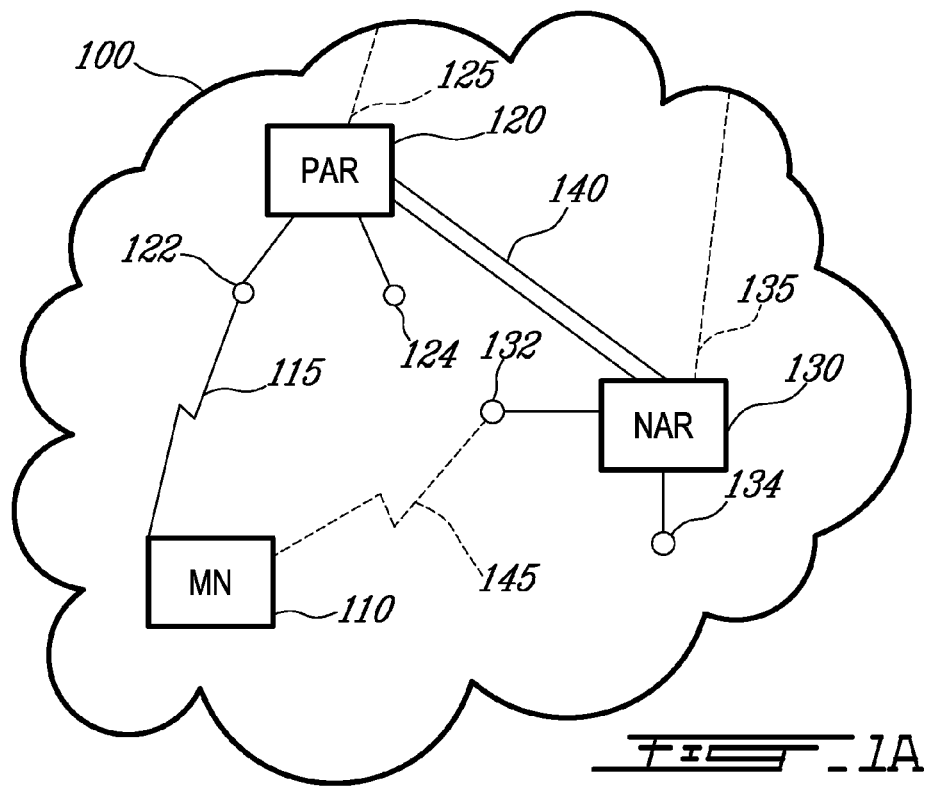
FIGS. 1A and 1B are exemplary topology representations of a data communications network in accordance with the teachings of the present invention.
Figure 1B:
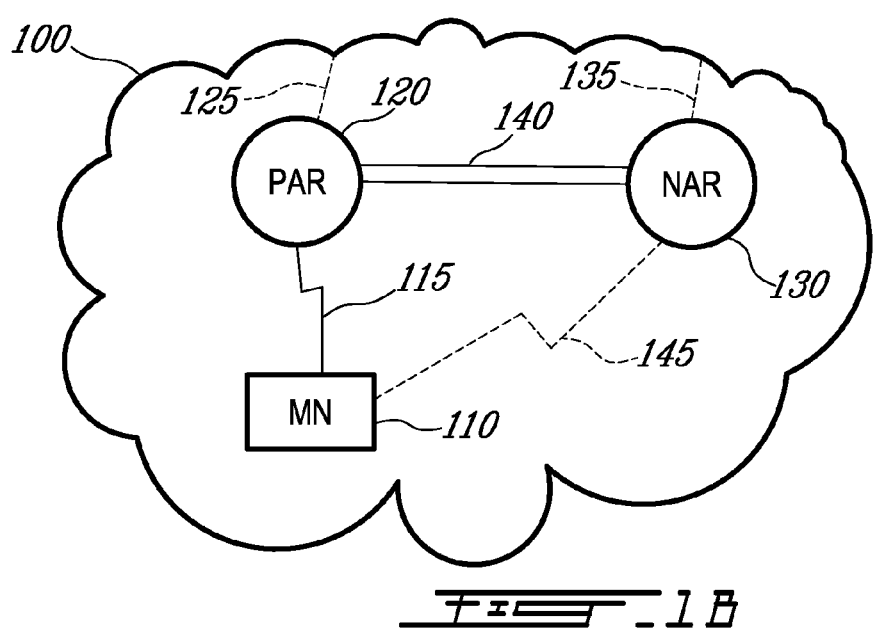

Reference is now made to the drawings in which FIGS. 1A and 1B show two exemplary topology representations of a data communications network 100 in accordance with the teachings of the present invention. FIG. 1A shows a Mobile Node MN 110 connected to an current serving access router (PAR) 120 via an access point 122. The PAR 120 has another access point 124 not currently used by the MN 110. It should be understood that two access points 122, 124 are shown on FIG. 1A while any number would accomplish the same function within the scope of the present invention.

The connection between the access point 122 and the MN 110 is shown as a wireless connection 115, but the present invention is not limited to any type of connection between the access point 122 and the MN 110. Similarly, the connection between the access point 122 and the PAR 120 is shown as a wired connection while it could be any type of connection. Furthermore, the present invention is not limited to any specific wireless or wired protocols as long as the MN 110 is connection with the PAR 120 using a first address of the MN valid under the PAR 120.

The data communications network 100 shown on FIG. 1A also comprises a next serving access router (NAR) 130 also having access points 132, 134 connected thereto. FIG. 1A also shows a tunnel 140 between the NAR 130 and the PAR 120. The tunnel may be the result of a static configuration made by administrators of the data communications network 100, but can also be dynamically setup and maintained using elements of the present invention, as will be more appreciable in the description of other Figures of the present application. The PAR 120 and the NAR 130 enable connectivity of the MN 110 with further nodes (not shown) of the data communications network 100. Thus, both the PAR 120 and the NAR 130 are in communication with other nodes (not shown) via further links (e.g., 125, 135) in order to provide such connectivity.

A further link 145 is further shown on FIG. 1A between the MN 110 and the access point 132 of the NAR 130. The MN 110 of the present invention is capable of forming an address valid under the NAR 130. In the context of the present invention, forming the address could require steps performed in the data communications network 100 or not, depending on the type of address. For instance, an IPv6 address can be formed and validated by the MN 110 (also referred to as stateless auto-configuration) or can also be allocated by the NAR 130 from a pool of addresses to the MN 110. An IPv4 address could need to be assigned by a server of the data communications network 100. The same applies to the types of address.

The link 145 (having similar or different characteristics compared to 115) is needed upon movement of the MN 110 which requires a handover towards the NAR 130. The following Figures will describe the mechanism of the present invention enabling and providing for the handover.

FIG. 1B repeats most of the elements already shown on FIG. 1A with the exception of access points 122, 124, 132 and 134. FIG. 1B can be seen as a simplification of FIG. 1A in which the access points 122, 124, 132 and 134 are removed since they do not contribute to better definition of the invention. FIG. 1B can also be seen as a variance of FIG. 1A in which the PAR 120 and NAR 130 are directly in connection with the MN 110. This can be the case, for instance, if the functionalities of the PAR 120 and/or the NAR 130 comprise the access point functionalities. A mix between the topologies of FIGS. 1A and 1B is also feasible within the teachings of the present invention.

FIG. 2 shows an exemplary signal and nodal operation chart of a handover mechanism, within the data communications network 100, in accordance with the teachings of the present invention. FIG. 2 can represent to a system for enabling the handover in the data communications network 100. A prerequisite of the example as shown is that at least one tunnel exists 140 between the PAR 120 and the NAR 130. For instance, there could be two unidirectional tunnels or one bidirectional tunnel therebetween without affecting the teachings of the invention. As another option, there could be multiple parallel tunnels used for multiple purposes (such as different sets of characteristics for different types of traffic). As mentioned earlier, further portions of the present description teach how to dynamically setup the at least one tunnel that exists 140.

The MN 110 further has a first address valid under the PAR 120 (210). For instance, the first address can be an IPv6 address obtained through one of the prior art methods related to Mobile IPv6. It could also be an IPv4 address obtained through a Dynamic Host Configuration Protocol (DHCP) server or any other type of address. The MN 100 can optionally be in an active data session (212) with a further node (not shown) sometimes referred to as a Correspondent Node (CN). The CN could be in a same autonomous system (AS) or domain of the data communications network 100 or could be located in a remote portion of the data communications network 100 without affecting the teachings of the present invention. As mentioned earlier, the MN 110 is capable of forming a second address in relation with the NAR 130.

The MN first detects 214 a need to handover from the PAR 120 to the NAR 130. That can be done in multiple ways, which do not affect the principle of the present invention. For instance, the detection 214 can occur upon reception of a Router Advertisement (RtAdv) message sent by the NAR 130. It could also occur following information received by the MN 110 concerning availability of new Wireless Local Area Network (WLAN) access points. The detection 214 could also be pushed by a user selection. Such a user selection could cause the MN 110 to switch between access technologies (e.g., WLAN to any third generation (3G) cellular access), to change a provider within the same access technology (e.g., two providers having concomitant coverage with different features) or to change its emitting power level thereby changing from a macro cell to a micro or pico cell. The detection 214 could further be suggested or imposed by a node of the data communications network 100 for, as an example, a wide array of network management reasons. As can be appreciated, the detection 214 could come from many sources, from various layers of the OSI model, without affecting the teachings of the present invention. The detection 214 may preferably provide the MN 110 with an identifier of the NAR 130. This could be the case if, for instance, the MN 110 receives a OSI Layer 2 trigger comprising an identifier of a network prefix of the NAR 130.

After the detection 214, the MN 110 sends a handover request 216 towards the PAR 120. The handover request 216 may comprise an identifier of the NAR. The handover request 216 can also be seen as a request sent to ask the PAR 120 to start using the existing tunnel 140. Optionally, the MN 110 may send an identity token 218 to the PAR 120 in order to enable marking of the traffic within the tunnel existing 140 between the PAR 120 and the NAR 130. To achieve that purpose, the identify token is further forwarded to the NAR 130 (218'). It can be forwarded (218') immediately as shown on FIG. 2. However, preferably the identity token is sent within the tunnel piggybacking the traffic (later step 230), but it could also be sent outside the tunnel. If the MN 110 sent the token 218 to the PAR 120, it also needs to send the same identity token to the NAR 130 (222) in order for the NAR 130 to correlate the identity tokens and mark the traffic for the MN 110. The identify token sent to the NAR 222 is likely to be done at a later time, once traffic will be exchanged on the tunnel, but could be done separately after completion of the sub layer (e.g., OSI layer 2) handover with the NAR 130 (220).

Upon completion of the sub layer handover with the NAR 130 (220), the MN 110 does not discard its first address (224). This is made possible by the present invention since the underlying layer addressing used by the MN 110 is valid under the NAR 130 even though the first address of the MN 110 may not be valid under the NAR 130 (e.g., the subnet or network identifier of the first address valid under the PAR 120 is not the same as the network identifier used by the NAR 130).

In the mean time, the PAR 120 continues to receive traffic 226 on the first address of the MN 110. Following reception of the handover request 216, the PAR 120 starts forwarding traffic received for the MN 110 on its first address on the tunnel 140 towards the NAR 130 (228). The NAR 130, following completion of the underlying layer handover of the MN 110 with the NAR 130 (220), forwards traffic received for the MN 110 on the tunnel 140 on the first address to the MN 110 (232). Likewise, traffic (234) sent to the NAR 130 by the MN 110 using its first address (236) is forwarded to the PAR 120 on the tunnel by the NAR 130 (238).

As mentioned above, the MN 110 may be in the active data session 212 before detecting the need 214 to handover. In such a case, upon completion of the session 212 (246), it may release the first address (248). The MN 110 may form the second address (244) only at that time, i.e. upon completion of the session 212 (246). If the MN 110 forms the second address (244) only upon completion of the session 212 (246), then the MN 110 may optionally also send an indication of address release (250) to the NAR 130, which could then push a second address thereby participating in the formation of the second address in the MN 110 (244). It is also possible for the MN 110 to take part in a new session A 242A using the first address while connected to the NAR 130. The MN 110 may also form the second address (244) upon detecting a need to initiate a further data session (242B) after completion of the handover 220. In that case, an exemplary arrangement of steps is shown on FIG. 2 where the active session 212 is first terminated (248), the first address is released (248), the second address is formed (244) and the new session is initiated (242B). As a last example, the MN 110 may form the second address (244) simply following completion of the handover 220. Forming the second address (244), in all mentioned preceding examples, may require interaction between the MN 110 and the NAR 130.

In the preceding example of FIG. 2, the NAR 130 and/or the PAR 120 may buffer traffic received for the MN 110 while the MN 110 is not yet reachable (e.g., if traffic is received at the NAR 130 from the PAR 120 before completion of the handover 212). The PAR 120 should not have to provide the buffer functionality in cases of real-time sessions. However since dynamic queuing can be introduced, both the PAR 120 and NAR 130 may have the capability to buffer the traffic.

FIG. 3 shows a flow chart of a method for enabling the handover of the MN 110 from the PAR 120 to the NAR 130 in the data communications network 100. As mentioned previously, at least one tunnel 140 is present between the PAR 120 and the NAR 130 to enable data exchange therebetween. The MN 110 has a first address valid under the PAR 120 (310). The first address may or not be valid under the NAR 130. The MN 110, also as mentioned previously, is capable of forming the second address valid under the NAR 130 prior to completion of the handover. Upon detection of the need for performing the handover (312), the MN sends a handover request to the PAR 120 that may comprise an identifier of the NAR 130 (314). The handover request can also be seen as a tunnel activate message. The step 312 is similar to the step 214 described with relation to FIG. 2. Thereafter, the MN may send an identify token to the PAR 120 (316). The identity token may advantageously be included in the handover request message. The MN further proceeds with a connection on a sub layer with the NAR 130 without discarding the first address (318) (completing a sub layer handover to the NAR 130 once the sub layer connection to the PAR 120 is released). The steps 318 and 316 could be inverted without problems.

Once connected to the NAR 130 (e.g., after completion of a sub-layer handover towards the NAR 130 or via a concurrent connection while still connected to the PAR 120 as well), the MN 110 may send the identify token (within a handover request message or not) to the NAR 130 (320). This is mostly relevant if the MN 110 sent the identity token to the PAR 120 previously (316). The MN 110 can then complete the sub layer handover (if not already done) towards the NAR 130, still without discarding its first address. Traffic can then be received at the MN 110 on its first address while being connected to the NAR 130 (324). The MN 110 may also send traffic using its first address to the NAR 130 (not shown on FIG. 3). The MN 110 is then free to discard its first address (326) (following any condition such as completion of a previous data session). The MN 110 may also inform the NAR 130 that the first address is to be released (322). The MN 110 is also able to form its second address valid under the NAR 130 (328). Informing the NAR 130 of the first address release (322) is of particular relevancy if the NAR 130 is to be involved in the formation of the MN 110 second address.

Figure 4:
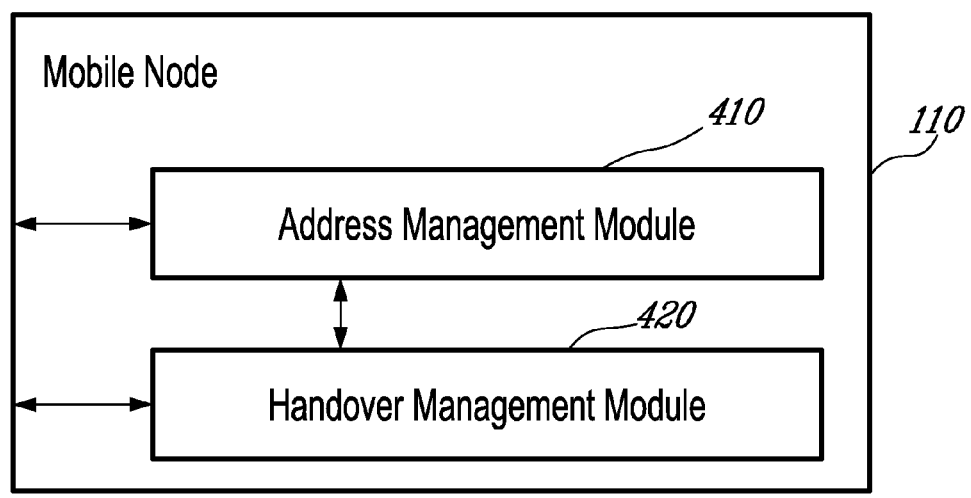
FIG. 4 is a modular representation of a mobile node for enabling handover from a current serving access router to a next serving access router in a data communications network in accordance with the teachings of the present invention.

FIG. 4 shows a modular representation of the MN for enabling handover from the PAR 120 to the NAR 130 in the data communications network 100 in accordance with the teachings of the present invention. In relation to what has already been described, an address management module 410 of the MN 110 is responsible for maintaining the first address valid under the PAR 120 and is capable of forming the second address valid under the NAR 130 prior to completion of the handover. A handover management module of the MN 110 is responsible for sending the handover request to the PAR 120, proceeding with a connection to the NAR 130 without discarding the first address, completing the handover with the NAR 130 and receiving traffic sent on the first address from the NAR130.

The handover management module may further send the identity token to the PAR 120 after sending the handover request. Likewise, the handover management module may further send the identity token to the NAR 130 before completing the handover. As mentioned above, the identity token is used by the NAR 130 and the PAR 120 to identify the traffic of the MN 110 on the preexisting tunnel 140.

The address management module of the MN 110 may further, upon completion of a session active at the time the handover request is sent, release the first address and form the second address. The address management module may also, upon initiation of a session after completion of the handover, forms the second address valid under the NAR 130.

FIG. 5 shows a nodal operation and signal flow chart of an exemplary dynamic setup of at least one tunnel between two nodes in the data communications network 100 in accordance with the teachings of the present invention. In order to simplify understanding, the PAR 120 and the NAR 130 of the previous exemplary description will be used with reference to the following example. However, it should be understood that the proposed procedure can be used between any two nodes interested in tunneling data therebetween, including access routers such as the PAR 120 and the NAR 130.

As a starting point, a set of minimal characteristics of the tunnel to be established needs to be determined (510). This determination 510 may be done dynamically, e.g., through usage statistics analysis, or statically e.g., by input from a network administrator. The way the determination 510 is made is, however, outside the scope of the invention.

The PAR 120 determines a first set of desired characteristics of the tunnel (512) being at least equal to the set of minimal characteristics of the tunnel previously determined. In the present example, the set of minimal characteristics comprises a sub-option indicating a need for an authentication characteristic for the tunnel. The PAR 120 thereafter requests establishment of a tunnel with the NAR via a tunnel request message (514) comprising the first set of desired characteristics of the tunnel. Since authentication is required, the PAR 120 then sends a shared secret key (516) to the NAR 130 together with an index value (518) associated with the shared secret 516. The NAR 130 thereafter creates a second set of desired characteristics of the tunnel (520) in view of its available resources and in view of the first set received in the tunnel request 514. The PAR 120 thereafter receives a tunnel reply message (522) comprising the second set of desired characteristics of the tunnel from the NAR 130. The PAR 120 may further receive a second shared secret (524) and an associated index value (526) is the NAR 130 decides to use a further set of values. The PAR 120 then verifies if the second set of desired characteristics of the tunnel is at least equal to the set of minimal characteristics of the tunnel (528). Multiple possibilities are thereafter available.

In the simplest example a bidirectional tunnel is being setup (either specified by the one of the sets of characteristics or by default). If the second set of desired characteristics of the tunnel is at least equal to the set of minimal characteristics of the tunnel, the PAR 120 sends a tunnel acknowledgment message (530) to the NAR 130. The tunnel 532 is thereafter made active. The shared secret(s) (516, 522) exchanged is then used by the PAR 120 and the NAR 130 to encrypt data sent on the tunnel 532. Only the index value(s) (518, 524) is sent by the PAR 120 and the NAR 130 on the tunnel 532 to indicate that the shared secret(s) 516, 522) is used to encrypt the data. Optionally, the shared secret exchange may be encrypted using, for instance, a public key of the receiving node.

As another possibility, a tunnel acknowledgment message (534) completes establishment of a first tunnel (536) asymmetric and unidirectional from the PAR 120 to the NAR 130. The PAR 120 thus needs to send a reverse tunnel request message (538) to the PAR 130 requesting establishment of a second tunnel in the opposite direction. The NAR 130 thus needs to create another set of desired characteristics of the tunnel with regards to the second tunnel (not shown separately as similar to 512). The PAR 120 thereafter receives a second tunnel request message (540) comprising the other set of desired characteristics of the second tunnel. After computation of a response set of characteristics (not shown separately as similar to 520), the PAR 120 sends a second tunnel reply message (542) comprising the response set of desired characteristics of the second tunnel to the NAR 130. Finally, the PAR 120 receives a second tunnel acknowledgment message (544) from the NAR 130 thereby completing establishment of the second tunnel (546).

If the comparison 528 shows that the set of desired characteristics of the tunnel determined in 528 is not at least equal to the set of minimal characteristics of the tunnel, the PAR 120 may determine another set of desired characteristics (548) still better than the minimal characteristics. The PAR 120 then sends a further tunnel request message (550) comprising the other set of desired characteristics of the tunnel. After determination of another response set of characteristics (552 similar to 520), the NAR 130 sends another tunnel reply message 554 to the PAR 120, which repeats the steps performed starting at 528.

Assuming that at least one tunnel was successfully setup, the NAR 130 may also wait for a limited period of time for a tunnel refresh message 556 from the PAR 120. If the tunnel refresh message is received, the NAR maintains the corresponding tunnel and resets a corresponding timer, but if no tunnel refresh message is received, then the corresponding tunnel is abandoned (e.g., actively closed, closed when resources needed, etc.).

Figure 6:
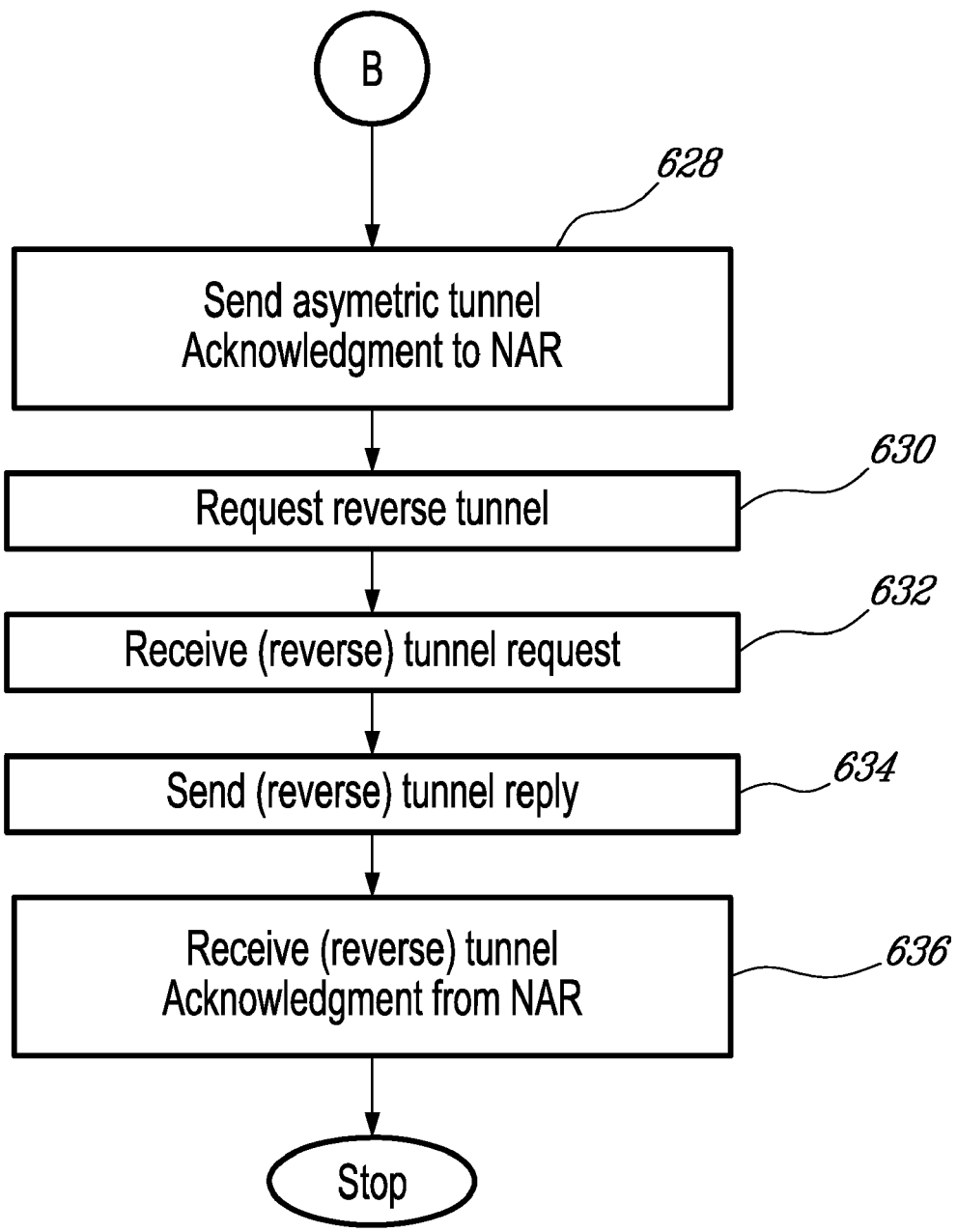
FIG. 6 is a flow chart of a method for dynamically establishing a tunnel with a set of minimal characteristics between a first node and a second node in a data communications network in accordance with the teachings of the present invention.

FIG. 6 shows a flow chart of a method for dynamically establishing a tunnel with a set of minimal characteristics between a first node (PAR 120 taken as an example) and a second node (NAR 130 taken as an example) in a data communications network 100 in accordance with the teachings of the present invention. The method starts at the PAR 120, which determines a first set of desired characteristics of the tunnel (610) being at least equal to the set of minimal characteristics of the tunnel. The first set of desired characteristics comprises a sub-option indicating a need for an authentication characteristic for the tunnel (612). The PAR 120 then request establishment (614) of a tunnel with the NAR 130 via a tunnel request message comprising the first set of desired characteristics of the tunnel. Thereafter, the PAR 120 sends a shared secret key to the NAR 130 (616) together with an index value associated with the shared secret (618). Following processing of the request at the NAR 130 and determination a second set of desired characteristics of the tunnel, the PAR 120 receives a tunnel reply message (620) comprising the second set of desired characteristics of the tunnel from the second node. The PAR 120 then verifies if the second set of desired characteristics of the tunnel is at least equal to the set of minimal characteristics of the tunnel (622).

If the second set of desired characteristics of the tunnel is at least equal to the set of minimal characteristics of the tunnel, another verification concerning the type of tunnel, i.e. symmetric or asymmetric, can then occur (624) if the implementation provides for such a possibility. Thus, the PAR 120 sends a tunnel acknowledgment message to the NAR 130 (626):

if the second set of desired characteristics of the tunnel is at least equal to the set of minimal characteristics of the tunnel; and if the tunnel is symmetric or if the implementation does not take tunnel type into account.

The shared secret exchanged between the PAR 120 and the NAR 130 is used to encrypt data sent on the tunnel. Only the index value is sent on the tunnel to indicate that the shared secret is used to encrypt the data. Of course, sending the shared secret can optionally be performed by sending the shared secret encrypted with, for instance, a public key of the second node.

If the determination 624 is appropriate given the implementation and it is thereby determined that the tunnel previously setup is asymmetric, the method follows on the second page of FIG. 6 (continued) under the label B. A tunnel acknowledgment message from the PAR 120 to the NAR 130 completes establishment of the tunnel thereafter referred to as the first tunnel (628). The first tunnel is thus asymmetric and unidirectional from the PAR 120 to the NAR 130.

In such a scenario, the PAR 120 continues by sending a reverse tunnel request message to the NAR 130 (630) thereby requesting establishment of a second tunnel from the NAR 130 to the PAR 120. At that point, the NAR determines a third set of desired characteristics of the second tunnel. The PAR 120 thereafter receives a second tunnel request message (632) comprising the third set of desired characteristics of the second tunnel. The second tunnel request message can be referred to a reverse tunnel request but has, in fact, the same function as the previously introduced tunnel request.

The PAR 120 then determines a fourth set of desired characteristics of the second tunnel in view of its capabilities and sends a second tunnel reply message (634) comprising the fourth set of desired characteristics of the second tunnel to the NAR 130. Finally, if the NAR 130 agreed with the fourth set of characteristics of the second tunnel, the PAR receives a second tunnel acknowledgment message (636) from the NAR 130 thereby completing establishment of the second tunnel. Of course, negotiation of the fourth set of characteristics of the second tunnel can also occur between the NAR 130 and the PAR 120, but it is not shown at this point for simplicity and clarity purposes. A procedure similar to such negotiation is however described in the following lines with regards to the determination 622.

If the determination 622 was negative (i.e., if the second set of desired characteristics of the tunnel is not at least equal to the set of minimal characteristics of the tunnel), the PAR 120 may determine if it is useful to keep trying with the NAR 130 or, in other words, if a compromise between the set of characteristics if still possible (638). If the PAR 120 determines that it is not possible, it sends a non-acknowledgement message to the NAR 130 (640) thereby cancelling tunnel establishment. Otherwise, the PAR 120 restarts the method at 610. Until it reaches a compromise (626 or 636) or arrive at a conclusion that a compromise is not possible (640).

Figure 7:
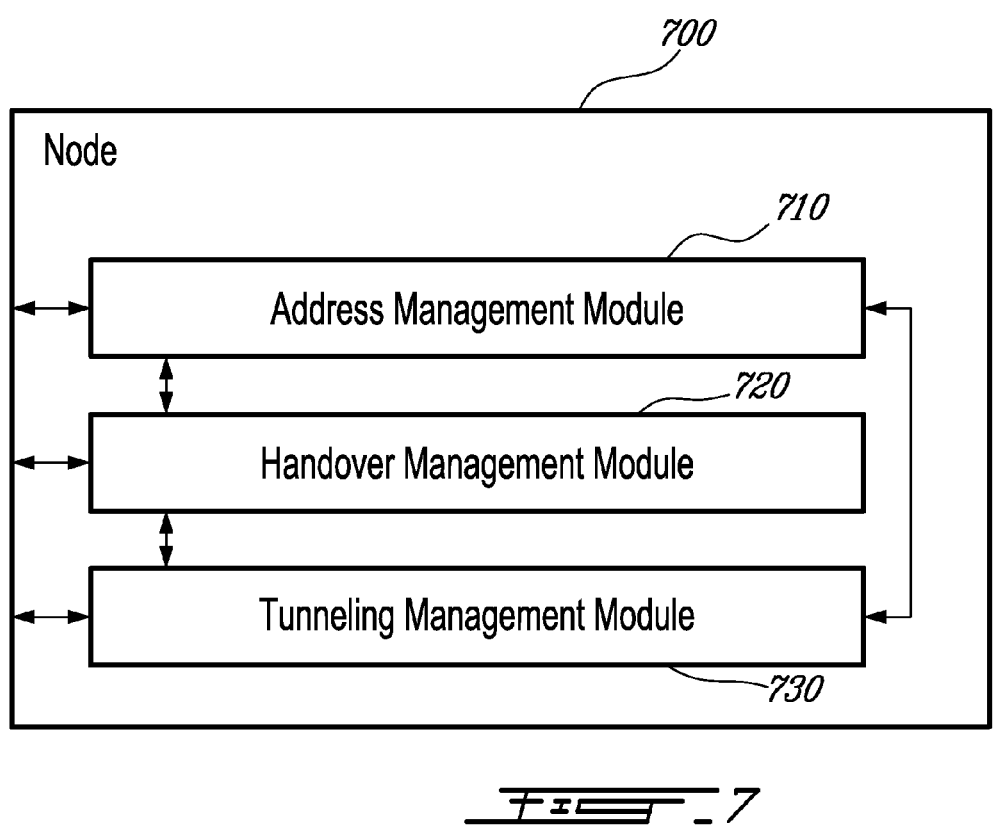
FIG. 7 is a modular representation of a node for establishing a tunnel with a set of minimal characteristics with a second node in a data communications network in accordance with the teachings of the present invention.

FIG. 7 shows a modular representation of a node 700 for establishing a tunnel with a set of minimal characteristics with a second node in a data communications network 100 in accordance with the teachings of the present invention. The node comprises a tunneling protocol module 730 that determines a first set of desired characteristics of the tunnel at least equal to the set of minimal characteristics of the tunnel and comprising a sub-option indicating a need for an authentication characteristic for the tunnel, requests establishment of a tunnel with the second node via a tunnel request message comprising the first set of desired characteristics of the tunnel, sends a shared secret key to the second node together with an index value associated with the shared secret, receives a tunnel reply message comprising a second set of desired characteristics of the tunnel from the second node, the second set of desired characteristics of the tunnel being determined by the second node, verifies if the second set of desired characteristics of the tunnel is at least equal to the set of minimal characteristics of the tunnel and, if so, sends a tunnel acknowledgment message to the second node. The shared secret is used by the node to encrypt data sent on the tunnel and the index value is sent by the node on the tunnel to indicate that the shared secret is used to encrypt the data. This has already been shown on multiple instances previously with regards to the PAR 120 acting as the aforementioned node 700.

The node 700, for instance if acting as an MIPv6 access router, may further comprise an address management module 710 and a handover management module 720. Those modules 710 and 720 can be used to act in accordance with prior art solutions not related to tunneling.

The address management module 710 of the node 700 may be responsible for the stateless and stateful address configuration. For example, in case of a handover is required, to accelerate the handover procedure, node 700 can manage an address pool and allocate a second address to the MN 110 thereby eliminating steps of second address validation otherwise needed in the MN 110 (e.g., DAD).

However, the address management module 710 and the handover management module 720 could also be used with the teachings of the present invention to proxy the functionalities currently implemented in the MN 110 in the node 700. In other words, and referring concurrently to FIGS. 4 and 7, the MN 110 could delegate some portions of its role with regards to its own address management module 410 and its own handover management module 420 respectively to the node 700 address management module 710 and the node 700 handover management module 720. The node 700 would thereby act as a proxy of the MN 110. A prerequisite for that would be an existing point-to-point connection between the node 700 and the MN 110 thereby alleviating the need for use of the addresses of the MN 110 in the communications with the node 700. In such an optional scenario, the node 700 would trigger the handover request in the name of the MN 100 and trigger the other messages from its perspective rather than from the MN 110 perspective. As such, some functionalities would need to be adjusted, e.g. address management issues.

The innovative teachings of the present invention have been described with particular reference to numerous exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

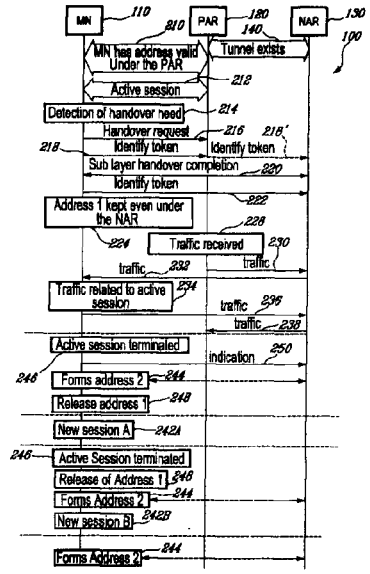

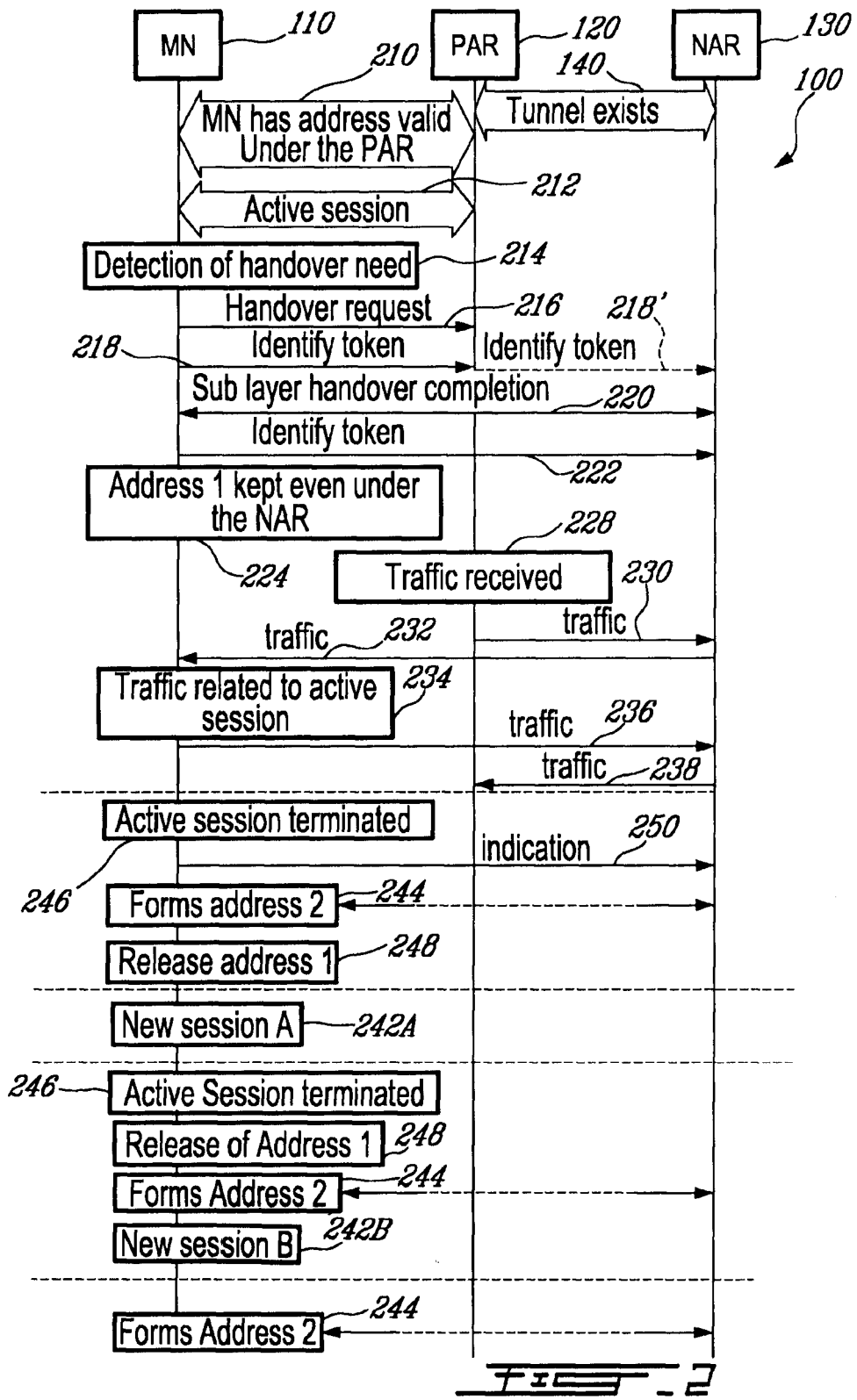

What is claimed is:

1. A system for enabling a handover in a data communications network of a mobile node (MN), the MN having a home address HoA, the system comprising:
   a current serving access router (PAR) with which the MN has a first address, the first address being different from the HoA;
   a next serving access router (NAR) with which the MN is capable of forming a second address, wherein at least one tunnel is present between the PAR and the NAR to enable data exchange therebetween;
   the MN:
      sends a handover request towards the PAR; and
      completes the handover with the NAR without discarding its first address;
   the PAR:
      forwards traffic received for the MN on its first address on the tunnel; and
   the NAR:
      following completion of the handover of the MN with the NAR, forwards traffic received for the MN on the tunnel to the first address of the MN.

2. The system of claim 1 wherein the handover request sent from the MN comprises an identifier of the NAR.

3. The system of claim 1 wherein the MN releases the first address upon completion of a session active at the time the handover request is sent.

4. The system of claim 1 wherein the MN forms the second address upon completion of a session active at the time the handover request is sent.

5. The system of claim 1 wherein the MN forms the second address upon initiation of a session after completion of the handover.

6. The system of claim 1 wherein the MN forms the second address following completion of the handover.

7. The system of claim 1 wherein:
   the MN:
      sends an identity token of the MN to the PAR; and
      before completion of the handover, sends the identify token to the NAR;
   the PAR:
      forwards the identify token to the NAR on the tunnel; and
   the NAR:
      identifies the MN with the identity token received from the PAR and the MN before forwarding traffic received for the MN on the tunnel to the first address of the MN.

8. The system of claim 1 wherein the NAR buffers traffic received for the MN on the tunnel while the MN is not yet reachable.

9. A method for enabling a handover of a mobile node (MN) from a current serving access router (PAR) to a next serving access router (NAR) in a data communications network, at least one tunnel being present between the PAR and the NAR to enable data exchange therebetween, the MN having a Home address (HoA), a first address valid under the PAR and being capable of forming a second address valid under the NAR prior to completion of the handover, the method comprising steps of:
   at the MN, sending a handover request to the PAR;
   at the MN, proceeding with a connection to the NAR without discarding the first address, the first address being different from the HoA;
   completing the handover between the MN and the NAR; and
   at the MN, receiving traffic sent on the first address from the NAR.

10. The method of claim 9, where the step of sending a handover request to the PAR comprises sending an identifier of the NAR.

11. The method of claim 9 further comprising steps of:
   after the step of sending the handover request, sending from the MN an identity token to the PAR to be used by the PAR to identify the traffic of the MN on the tunnel; and
   before the step of completing the handover, sending from the MN the identity token to the NAR to be used by the NAR to identify the traffic of the MN on the tunnel.

12. The method of claim 9 further comprising steps of:
   at the MN, completing a session active at the time the handover request is sent;
   at the MN, releasing the first address; and
   at the MN, forming the second address.

13. The method of claim 9 further comprising steps of:
   at the MN, forming the second address upon initiation of a session after the step of completing the handover.

14. A mobile node (MN) for enabling handover from a current serving access router (PAR) to a next serving access router (NAR) in a data communications network, at least one tunnel being present between the PAR and the NAR to enable data exchange therebetween, the MN having a Home Address (HoA) comprises:
   an address management module that:
      has a first address valid under the PAR, the first address being different from the HoA; and
      is capable of forming a second address valid under the NAR prior to completion of the handover;
   a handover management module that:
      sends a handover request to the PAR;
      proceeds with a connection to the NAR without discarding the first address;
      completes the handover between the MN and the NAR; and
      receives traffic sent on the first address from the NAR.

15. The MN of claim 14 wherein the handover request comprises an identifier of the NAR.

16. The MN of claim 14 wherein the handover management module further:
   after sending the handover request, sends an identity token to the PAR;
   before completing the handover, sends the identity token to the NAR; and
   wherein the identity token is used by the NAR and the PAR to identify the traffic of the MN on the tunnel.

17. The MN of claim 14 wherein the address management module, upon completion of a session active at the time the handover request is sent, releases the first address and forms the second address valid under the NAR 130.

18. The MN of claim 14 wherein the address management module, upon initiation of a session after completion of the handover, forms the second address valid under the NAR 130.

19. The MN of claim 14 wherein a point-to-point connection exists with the PAR and wherein at least a portion of the address management module functionalities and the handover management module functionalities are delegated to the PAR.

* * * * *

UNITED STATES PATENT AND TRADEMARK OFFICE
CERTIFICATE OF CORRECTION

| | | |
|---|---|---|
| PATENT NO. | : 7,606,201 B2 | Page 1 of 3 |
| APPLICATION NO. | : 11/410206 | |
| DATED | : October 20, 2009 | |
| INVENTOR(S) | : Zhang et al. | |

It is certified that error appears in the above-identified patent and that said Letters Patent is hereby corrected as shown below:

The title page showing the illustrative figure should be deleted to be replaced with the attached title page.

On the Title Page, item (56), under "OTHER PUBLICATIONS", in Column 2, Line 4, delete "Independant" and insert -- Independent --, therefor.

The drawing sheet, consisting of Fig. 2, should be deleted to be replaced with the drawing sheet, consisting of Fig. 2, as shown on the attached page.

In Column 1, Lines 9-10, delete "60/674,536," insert -- 60/674,356, --, therefor.

In Column 2, Line 29, delete "Secutiry" and insert -- Security --, therefor.

Signed and Sealed this

Sixteenth Day of March, 2010

David J. Kappos
*Director of the United States Patent and Trademark Office*

(12) United States Patent
Zhang et al.

(10) Patent No.: US 7,606,201 B2
(45) Date of Patent: Oct. 20, 2009

(54) HANDOVER ENABLER

(75) Inventors: Li Jun Zhang, Montreal (CA); Laurent Marchand, Montreal (CA)

(73) Assignee: Telefonaktiebolaget LM Ericsson (Publ). Stockholm (SE)

( * ) Notice: Subject to any disclaimer, the term of this patent is extended or adjusted under 35 U.S.C. 154(b) by 413 days.

(21) Appl. No.: 11/410,206

(22) Filed: Apr. 25, 2006

(65) Prior Publication Data

US 2006/0251022 A1    Nov. 9, 2006

Related U.S. Application Data

(60) Provisional application No. 60/674,356, filed on Apr. 25, 2005.

(51) Int. Cl.
*H04W 4/00* (2009.01)
(52) U.S. Cl. .................. 370/331; 370/328; 370/338; 455/436; 455/442
(58) Field of Classification Search .............. 370/331, 370/328, 338; 455/426, 442, 436
See application file for complete search history.

(56) References Cited

U.S. PATENT DOCUMENTS 6,775,533 B2 *   8/2004   Kakani et al. ............ 455/403
2004/0082330 A1 * 4/2004   Marin .................... 455/438

FOREIGN PATENT DOCUMENTS

EP    1 043 869 A2    10/2000

OTHER PUBLICATIONS

Perkins, Charles E.: "Mobile IPv6 and Seamless Mobility", Nokia Research Center, Mountain View, CA, USA; IEEE 802.16e-03/11; Jan. 2003/Mobile IPv6, 29 pages.
Fajardo, V. et al. : << Media-Independant Pre-Authentication (MPA) Implementation Results >> (draft-ohba-mobopts-mpa-implementation-02); MOBOPTS Research Group, Internet Draft, expires Sep. 5, 2006; 27 pages.
Dutta, A. et al. : << A Framework of Media-Independent Pre-Authentication (MPA) (draft-ohba-mobopts-mpa-framework-02) MOBOTS Research Group, Internet Draft, expires Sep. 6, 2006; 42 pages.
Draves, R.: "Default Address Selection for Internet Protocol", version 6 (IPv6), Microsoft Research, Feb. 2003.

* cited by examiner

*Primary Examiner*—Nghi H Ly
(74) *Attorney, Agent, or Firm*—Ericsson Canada Inc.

(57) ABSTRACT

A system, a method and a Mobile Node (MN) for enabling a handover of the MN from a current serving access router (PAR) to a next serving access router (NAR) in a data communications network. At least one tunnel is present between the PAR and the NAR to enable data exchange therebetween. The MN has a first address valid under the PAR and is capable of forming a second address valid under the NAR prior to completion of the handover. The MN sends a handover request to the PAR and proceeds with a connection to the NAR without discarding its first address. The MN then completes the handover towards the NAR and receives traffic sent on the first address from the NAR.

19 Claims, 8 Drawing Sheets